Sept. 30, 1924.   1,509,911
A. H. STEBBINS
DUST COLLECTOR
Filed April 15, 1922
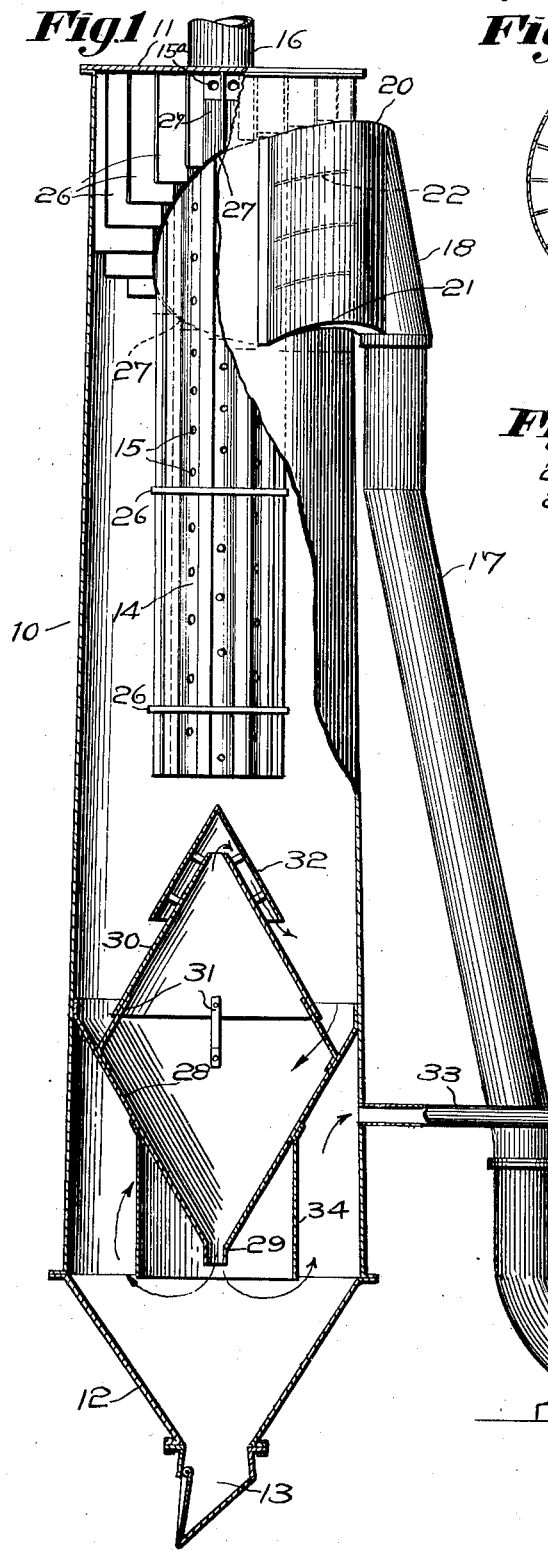
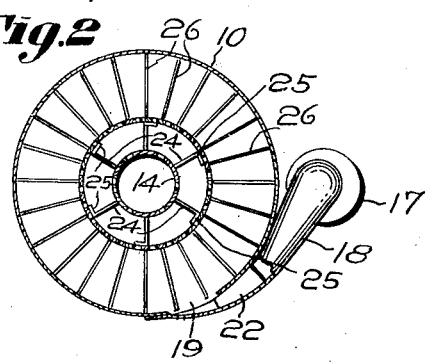
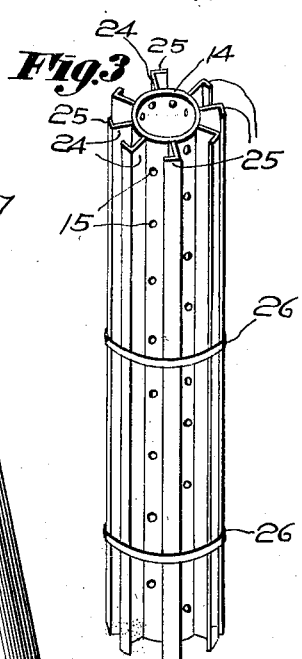
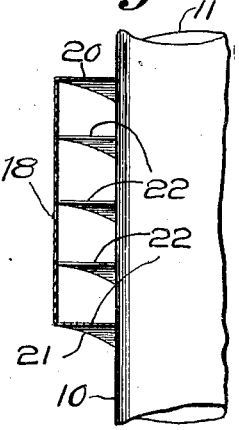
Inventor
Albert H. Stebbins
by his Attorney Patented Sept. 30, 1924.

1,509,911

UNITED STATES PATENT OFFICE.

ALBERT H. STEBBINS, OF LOS ANGELES, CALIFORNIA.

DUST COLLECTOR.

Application filed April 15, 1922. Serial No. 553,120.

*To all whom it may concern:*

Be it known that I, ALBERT H. STEBBINS, a citizen of the United States, residing at Los Angeles, in the county of Los Angeles and State of California, have invented an Improvement in Dust Collectors, of which the following description, in connection with the accompanying drawings, is a specification, like characters on the drawings representing like parts.

This invention relates to dust collectors of the type in which dust ladened air is introduced into a container to whirl about the walls thereof so that the particles of dust are thrown outwardly by centrifugal force away from the axis of the container.

In dust collectors of this type it has been customary heretofore to design the dust removing containers with a large horizontal diameter as compared with their vertical length to provide a chamber of large diameter in which the dust ladened air may travel as it whirls about the interior thereof. This construction promotes the separation of the dust from the air, but is open to the objection that the whirling force of the air relied upon to throw the dust outwardly by centrifugal force, is soon dissipated and beomes ineffective for this purpose.

One important feature of the present invention, therefore, resides in a dust removing container having a relatively small diameter as compared with its length, so that the whirling force imparted to the dust ladened air will cause the air to travel around the interior of the container several times before its energy is spent.

In dust collectors, difficulty is commonly experienced in preventing the dust carried by the air from escaping with the air passing out of the dust remover. Another important feature of the present invention therefore resides in an air removing tube extending centrally within the dust removing container a substantial distance and having apertures in its wall through which the air that is relatively free from dust may escape while the dust of the air is thrown outwardly away from the tube by centrifugal force.

Another feature of the invention resides in means for providing dead air chambers adjacent the points where the air enters the air removing tube.

Still another feature of the invention resides in means near the lower end of the dust remover container for arresting the downward movement of the air before it reaches the lower end of the container.

The above and other features of the invention will be described in connection with the accompanying drawings which show one good practical form of the invention the details of which may be modified within the true scope thereof as defined by the claims.

In the drawings:

Fig. 1 is a vertical sectional view through a dust collector constructed in accordance with the present invention.

Fig. 2 is a horizontal sectional view taken through the dust collector near the upper end of the same.

Fig. 3 is a perspective view of the inner tube and associated parts; and

Fig. 4 is an enlarged vertical sectional view taken through the inlet head.

The dust collector of the present invention has an outer container 10 preferably in the form of a tubular drum having a relatively small diameter as compared with its length, and the upper end of the container or drum 10 is closed by a cover 11 while the lower end is provided with means for discharging dust therefrom, such as a hopper 12 having the discharge opening 13.

Within the drum 10 is mounted a tube 14 for conducting air from the drum. This tube extends axially of the drum throughout a substantial portion of the length of the drum, and is provided with a plurality of apertures or openings 15 arranged along its length. In the construction shown the tube 14 extends centrally through the upper cover 11 into the drum, and has the portion 16 leading from the drum 10 to conduct therefrom the air from which the dust has been removed.

It is desirable to deliver the dust ladened air into the drum 10 with a whirling downward movement traveling around the tube 14, and to this end the air is led towards the upper end of the drum 10 through a tube 17, at the delivery end of which is provided a contracted discharge head 18 having a flattened rectangular construction in cross section as shown in Fig. 4, the arrangement being such that as the air passes from the head 18 through the opening 19 it is directed around the walls of the drum. The upper end 20 and lower end 21 of the head 18 preferably are bent downwardly slightly as shown to impart a downward movement to the air as it enters the drum, and downward movement is further imparted to the air by the spaced downwardly curved plates 22 within the head 18. The dust ladened air should be delivered to the dust collector under pressure, and to this end a fan 23 may be provided for forcing the air through the pipe 17 into the drum 10.

As the air whirls about the inner walls of the drum 10, the particles of dust are thrown outwardly by centrifugal force against the walls and fall downwardly towards the hopper at the lower end of the drum, and the air which has given up a large portion of the dust is crowded inwardly toward the central tube 14 to enter the tube through the apertures 15. It is desirable to prevent whirling movement of the air adjacent the tube 14 further to promote the separation of dust from the air, and to this end vanes 24 may be provided projecting outwardly from the tube and extending longitudinally thereof, and the outer marginal portions of the vanes 24 preferably are bent laterally as at 25 in the direction in which the air travels about the tube. The construction is such that the vanes 24 with their bent marginal portions 25 form dead air chambers about the tube 14 from which the air entering the tube is drawn. Hoops 26 may be placed about the vanes 24 as shown to secure them in place.

The construction of the head 18 described serves to impart a downward movement to the air as it enters the drum 10, and this downward movement may be further promoted by providing spirally disposed deflecting means in the upper portion of the case. In the construction shown a series of blades 26 of progressively increasing length are provided extending downwardly from the upper end of the drum and disposed radially within the drum so that the air will be directed downwardly by the lower ends of the blades. The blades 26 may be secured in place by fastening their inner edges to a drum 27 that encircles the upper portion of the vanes 24, and the tube 14 preferably is provided with additional apertures 15ᵃ near the upper ends of the blades 26 to remove the air that is forced upwardly between the blades.

It is desirable to permit the dust removed from the air to travel downwardly into the hopper 12, while, at the same time the downwardly whirling air is prevented from entering this hopper, and to this end baffle means may be provided in the lower portion of the drum 10 to arrest the downward movement of the air. In the construction shown an inverted cone 28 is provided that completely closes off the lower portion of the drum 10 from the upper portion thereof with the exception of the small dust outlet 29, and above the cone 28 is provided an upright cone 30 held in spaced relation to the cone 28 by bars 31. The cone 30 checks the downward movement of the air, but should sufficient air enter the cones 28 and 30 to raise the pressure of the air therein, the excess air may escape through the opening in the upper end of the cone 30. It is not desirable to permit the air that escapes from the top of the cone 30 to flow directly into the lower open end of the tube 14 and a cap 32 is therefore provided upon the cone 30 to direct the escaping air downwardly as indicated by the arrows.

It may be desirable to provide further means for reducing the air pressure in the lower portion of the drum 10, and to this end a suction pipe 33 may be provided leading from the lower portion of the drum to the suction side of the fan 23. An apron 34 suspended from the cone 28 prevents air from traveling direct from the opening 29 to the pipe 33.

From the foregoing description when read in connection with the drawings, it will be seen that the dust laden air may whirl completely around the tube 14 several times before it reaches the lower portion of the drum 10, and it will be apparent that this serves effectively to throw the dust outwardly away from the central tube through which the unloaded air is gently removed. The disposition of the apertures around and lengthwise of the tube 14 in combination with the vanes 24 avoids the creation of strong air currents that would suck dust into the tube 14.

What is claimed is:

1. A dust collector comprising, in combination, an upright drum possessing a length substantially greater than its diameter and having a closed upper end and means for discharging dust from its lower end, an air discharge tube extending centrally downwardly within the drum for a substantial portion of the length of the latter and having apertures in its walls at intervals along the tube for the passage of air into the tube from the drum, means for delivering dust ladened air into the upper portion of the drum with a downward movement whirling about the tube so that the particles of dust are thrown outwardly by centrifugal force away from the tube, and vanes extending outwardly from the tube to prevent whirling movement of the air adjacent the apertures and constructed to form dead air chambers at the entrance to the apertures.

2. A dust collector comprising, in combination a drum having a closed upper end and means for discharging dust from its lower end, a tube for conducting air from the drum extending through the closed upper end into the drum a substantial distance and having apertures in its walls for the passage of air into the tube from the drum, means for introducing dust ladened air into the upper portion of the drum to whirl about the tube, and a series of blades of progressively increasing length extending downwardly from the upper end of the drum and disposed radially within the drum to direct the whirling air downwardly, said tube having apertures near the upper end of the downwardly extending blades to remove air from between the blades.

3. A dust collector comprising, in combination a tubular drum having means for discharging dust from its lower end, a tube for conducting air from the drum extending axially within the drum and having apertures in its walls for the passage of air from the drum into the tube, means for introducing dust ladened air into the drum to whirl about the tube in a downward direction to throw the particles of dust outwardly from the tube by centrifugal force, means in the lower portion of the drum for arresting the downward movement of the air, and auxiliary means lying out of the path of the downwardly moving collected dust for removing air from the lower portion of the drum.

4. In a dust collector, the combination of an air and dust chamber, means for introducing dust laden air into the chamber and imparting air and dust separating movements thereto, an air discharge conduit arranged centrally of the chamber longitudinally thereof and having a multiplicity of openings communicating with the air and dust chamber at different points longitudinally of the conduit gently to remove the air from the chamber, and means for forming dead air chambers adjacent the inlet side of said openings.

5. In a dust collector, the combination of an air and dust chamber, means for introducing dust laden air into the chamber and imparting air and dust separating movements thereto and an air exit arranged centrally of the chamber longitudinally thereof and having a multiplicity of openings communicating with the air and dust chamber at different points longitudinally of the chamber gently to remove the air from the chamber, a dust collecting chamber in connection with the air and dust chamber, and means for exhausting the air in the dust collecting chamber at a point therein above and to one side of the communication between the dust collecting chamber and the air and dust chamber.

6. A dust collector comprising, in combination, a container having a closed upper end and means for discharging dust from its lower end, an air discharge tube extending longitudinally within the container for a substantial distance and having apertures disposed along its length for the passage of air into the tube from the container, means for delivering dust ladened air into the container with a whirling movement to throw the dust outwardly away from the tube, and vanes extending outwardly from the sides of said tube and having their outer marginal edges bent laterally at an angle in the direction in which the air whirls within the container to form dead air chambers adjacent said apertures.

7. A dust collector comprising, in combination, an upright drum possessing a length substantially greater than its diameter and having means for discharging dust from its lower end, an air discharge tube extending longitudinally within the drum for a substantial portion of the length of the latter and having apertures in its walls along the length of the tube for the passage of air into the tube from the drum, means for introducing dust ladened air into the upper portion of the drum with a downward movement whirling about the tube so that the particles of dust are thrown outwardly by centrifugal force away from the tube, and vanes extending outwardly from the walls of the tube and bent in the direction in which the air whirls within the container to form dead air chambers supplying air to the apertures.

8. A dust collector comprising, in combination, an upright drum possessing a length substantially greater than its diameter and having a separate dust receiving chamber at its lower end, a tube extending downwardly within the drum to conduct air therefrom and having apertures disposed along its length for the passage of air into the tube, means for delivering dust laden air into the space between the drum and tube with a whirling movement to throw the heavier particles outwardly by centrifugal force, vanes extending outwardly from the sides of the tube adjacent the apertures and bent to form partly closed chambers about the apertures that exclude the whirling air and supply dead air to the apertures, means for excluding air within the main portion of the drum from the separate dust receiving chamber comprising an inverted cone fitted within the lower portion of the drum to completely close off the lower portion of the drum from the upper portion thereof with the exception of a small dust outlet at the lower end of the cone, and an upright cone supported above the inverted cone to arrest the whirling air that tends to enter the inverted cone.

In testimony whereof, I have signed my name to this specification.

ALBERT H. STEBBINS.